US012080434B2

(12) United States Patent
Heibel et al.

(10) Patent No.: US 12,080,434 B2
(45) Date of Patent: Sep. 3, 2024

(54) RADIOISOTOPE ACTIVITY SURVEILLANCE APPARATUS, SYSTEM, AND METHOD

(71) Applicant: Westinghouse Electric Company LLC, Cranberry Township, PA (US)

(72) Inventors: Michael D. Heibel, Broomfield, CO (US); Robert J. Fetterman, Gibsonia, PA (US); Michael J. Prible, Cranberry Township, PA (US); Jianwei Chen, Wexford, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 510 days.

(21) Appl. No.: 17/099,139

(22) Filed: Nov. 16, 2020

(65) Prior Publication Data
US 2022/0155468 A1 May 19, 2022

(51) Int. Cl.
*G21C 17/06* (2006.01)
*G01T 3/00* (2006.01)
(Continued)

(52) U.S. Cl.
CPC .............. *G21C 17/06* (2013.01); *G01T 3/006* (2013.01); *G21C 17/104* (2013.01); *G21C 23/00* (2013.01); *G21G 1/02* (2013.01)

(58) Field of Classification Search
CPC .. G01T 1/17; G01T 1/167; G01T 7/08; G01T 3/006; G21C 17/10; G21C 17/102;
(Continued)

(56) References Cited

U.S. PATENT DOCUMENTS 3,872,311 A * 3/1975 Goldstein ............... G01T 3/006
250/391
4,091,288 A * 5/1978 LeVert .................... G01T 3/006
250/370.04
(Continued)

FOREIGN PATENT DOCUMENTS

EP 0151969 A1 8/1985
EP 2073215 A1 6/2009
(Continued)

OTHER PUBLICATIONS

Espacenet translation of WO2016/161728 (Year: 2016).*
(Continued)

*Primary Examiner* — Sharon M Davis
(74) *Attorney, Agent, or Firm* — K&L Gates LLP

(57) ABSTRACT

Disclosed are a radioisotope activity surveillance system and methods. The system includes a fuel rod assembly having a plurality of nuclear fuel rods and a target assembly having a top nozzle including an orifice plate and at least one target material rod fixedly coupled to the orifice plate. The least one target material rod is slidably disposed within the fuel rod assembly. A sensing assembly defines an opening sized and configured to receive the target assembly therethrough. The sensing assembly includes a self-powered detector assembly to detect radioisotope activity of the target rod material. Also disclosed is a method for measuring a self-powered detector signal to calculate radioisotope activity of a target assembly and a method for analyzing total activity of a desired radioisotope.

12 Claims, 6 Drawing Sheets

(51) Int. Cl.
*G21C 17/104* (2006.01)
*G21C 23/00* (2006.01)
*G21G 1/02* (2006.01)

(58) Field of Classification Search
CPC ...... G21C 3/3315; G21C 23/00; G21C 17/06;
G21C 17/063; G21C 17/104; G21G 1/02;
G21G 1/06; G21G 1/08
See application file for complete search history.

(56) References Cited

U.S. PATENT DOCUMENTS

| | | | | |
|---|---|---|---|---|
| 4,284,893 A | * | 8/1981 | Allan | G01T 3/006 |
| | | | | 376/153 |
| 4,335,466 A | | 6/1982 | Lee | |
| 4,510,117 A | * | 4/1985 | Phillips | G21C 17/06 |
| | | | | 976/DIG. 231 |
| 4,728,483 A | | 3/1988 | Ahmed et al. | |
| 5,745,538 A | * | 4/1998 | Heibel | G21C 17/108 |
| | | | | 376/254 |
| 9,299,468 B2 | | 3/2016 | Hidem et al. | |
| 9,922,737 B1 | * | 3/2018 | Fero | G21C 17/102 |
| 10,734,121 B2 | | 8/2020 | Pomirleanu et al. | |
| 2006/0056566 A1 | | 3/2006 | Vandergheynst et al. | |
| 2009/0135990 A1 | * | 5/2009 | Poon | G21C 3/328 |
| | | | | 376/438 |
| 2016/0012925 A1 | | 1/2016 | Ahlberg | |
| 2018/0137945 A1 | * | 5/2018 | Chichester | G21C 17/063 |
| 2018/0336974 A1 | * | 11/2018 | Heibel | G21F 5/015 |

FOREIGN PATENT DOCUMENTS

| | | | | |
|---|---|---|---|---|
| EP | 3117440 A2 | | 1/2017 | |
| EP | 3117441 B1 | | 8/2018 | |
| WO | WO-0195340 A1 | * | 12/2001 | ............. G21C 17/06 |
| WO | WO-2016161728 A1 | * | 10/2016 | ............... G21G 1/02 |
| WO | WO-2021076673 A1 | * | 4/2021 | ............... G21G 1/02 |

OTHER PUBLICATIONS

Annex to Form PCT/ISA/206 dated Mar. 14, 2022, Communication relating to the results of the partial International Search for corresponding International PCT Application No. PCT/US2021/072404.
International Search Report and Written Opinion for International PCT Application No. PCT/US2021/072404, dated Jun. 7, 2022.
Search Report for corresponding Taiwan Patent Application 110142623, dated Sep. 30, 2022.

* cited by examiner

RADIOISOTOPE ACTIVITY SURVEILLANCE APPARATUS, SYSTEM, AND METHOD

BACKGROUND

The present disclosure relates generally to a radioisotope activity surveillance apparatus, system and method. More particularly, the present disclosure relates generally to a radioisotope activity surveillance apparatus, system and method for use with fuel assembly insert targets. The present disclosure also pertains to techniques for measuring and analyzing signals received from the surveillance tool and calculating the radioisotope activity of a target assembly.

The production of desired amounts of medical or industrial radioisotopes inside a commercial power generating reactor, such as Cobalt-60 (Co-60), requires that a target material is placed inside the reactor and receive a specific neutron flux exposure level for a minimum amount of reactor operating time. In order to determine whether the irradiation target is actually ready to harvest requires that the activity level of the desired radioisotope inside the target assembly is measured. Thus, there is a need for an apparatus, system, and method to measure the activity of a desired radioisotope during a reactor refueling outage to determine whether to extract and process the irradiation target material. There is also a need to determine the progress of the production of the desired radioisotope during refueling outages that occur prior to the expected harvesting time.

SUMMARY

In one aspect, the present disclosure provides a radioisotope activity surveillance system, comprising a fuel rod assembly comprising a plurality of nuclear fuel rods; a target assembly comprising: a top nozzle comprising an orifice plate; and at least one target material rod fixedly coupled to the orifice plate, wherein the at least one target material rod is slidably disposed within the fuel rod assembly; and a sensing assembly defining an opening sized and configured to receive the target assembly therethrough, the sensing assembly comprising a self-powered detector assembly to detect radioisotope activity of the target rod material.

In another aspect of the radioisotope activity surveillance system, the self-powered detector assembly comprises: a sensing portion comprising an emitter wire; and a signal wire electrically coupled to the emitter wire; wherein the emitter wire is made of a prompt responding gamma sensitive material and generates an electrical current when exposed to gamma radiation; and wherein the emitter wire and the signal wire are encased in an outer sheath.

In another aspect of the radioisotope activity surveillance system, the emitter wire comprises platinum.

In another aspect of the radioisotope activity surveillance system, the signal wire is made of steel.

In another aspect of the radioisotope activity surveillance system, wherein the outer sheath is made of steel. In another aspect of the radioisotope activity surveillance system, the outer sheath is filled with an electrical insulator material. In another aspect of the radioisotope activity surveillance system the electrical insulator material is Magnesium Oxide (MgO).

In another aspect of the radioisotope activity surveillance system, the sensing assembly comprises: an inner case; an outer shielding; and a space defined therebetween to accommodate a spiral wound sensing portion of the self-powered detector assembly.

In another aspect of the radioisotope activity surveillance system, the outer shielding is constructed of a material to shield the sensing portion emitter wire from gamma radiation originating from outside the sensing assembly. In another aspect of the radioisotope activity surveillance system, the outer shielding is constructed of tungsten (W).

In another aspect of the radioisotope activity surveillance system, the sensing assembly is connected to a handle. In another aspect of the radioisotope activity surveillance system, the handle is configured to position the sensing assembly at atop of the target assembly containing the target material rods to be extracted from/inserted into the fuel rod assembly.

In one aspect, the present disclosure provides a method for measuring a self-powered detector signal to calculate radioisotope activity of a target assembly, a target assembly comprising a top nozzle comprising an orifice plate and at least one target material rod fixedly coupled to the orifice plate, wherein the at least one target material rod is slidably disposed within the fuel rod assembly. The method comprises positioning a sensing assembly over a fuel rod assembly, the sensing assembly defining an opening sized and configured to receive the target assembly therethrough, the sensing assembly comprising a self-powered detector assembly to detect radioisotope activity of the target rod material; obtaining, by the sensing assembly, a first background gamma radiation signal measurement from external gamma sources; recording the first background gamma radiation signal measurement by a recorder; passing the target assembly through the sensing assembly at a constant rate; recording, by the recorder, a measured self-powered detector signal current (I) as a function of time while the target assembly passes through the sensing assembly; obtaining a second background gamma radiation signal measurement from external gamma sources after the target assembly is fully passed through the sensing assembly; and recording the second background gamma radiation signal measurement by the recorder.

In another aspect, the method comprises determining total radioisotope activity of the target assembly by integrating a fitted function of the measured self-powered detector signal current (I) versus time over an active length of the target assembly.

In another aspect, the method comprises determining an integrated region based on a withdrawal/insertion rate and the measured self-powered detector signal current (I) recorded when an active portion of the target assembly is inside the opening defined by the sensing assembly.

In another aspect of the method the first and second background gamma radiation signal measurements from external gamma sources are obtained by measuring a current (I) through the self-powered detector signal cable.

In one aspect, the present disclosure provides a method for analyzing total activity of a desired radioisotope. The method comprises recording a self-powered detector signal as function of time while a target assembly is passed at a constant rate through a sensing assembly, wherein the target assembly contains the target material rods being used to create the desired radioisotope; creating a representation of the background-corrected measured self-powered detector signal as a function of position along the target assembly; creating a function that provides a fitted representation of the measured self-powered detector signal as a function of the target assembly position (L); integrating the function over a length of the target assembly that contains the target material rods being used to create the desired radioisotope; and converting the integrated value to gamma activity based on gamma sensitivity.

In another aspect, the method comprises determining whether to harvest the desired radioisotope based on the gamma activity.

In another aspect of the method the function has the form of:

$$-y(L)=a_0+a_1(L)+a_2(L)^2+a_3(L)^3+\ldots+a_n(L)^n.$$

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Various features of the embodiments described herein, together with advantages thereof, may be understood in accordance with the following description taken in conjunction with the accompanying drawings as follows.

Corresponding reference characters indicate corresponding parts throughout the several views. The exemplifications set out herein illustrate various embodiments of the invention, in one form, and such exemplifications are not to be construed as limiting the scope of the invention in any manner.

DETAILED DESCRIPTION

In one aspect, the present disclosure provides a radioisotope activity surveillance apparatus, system and method to measure the activity of a desired radioisotope during a reactor refueling outage to determine whether to extract and process the irradiation target material. In another aspect, the present disclosure provides a radioisotope activity surveillance apparatus, system and method to determine the progress of the production of the desired radioisotope during refueling outages that occur prior to the expected harvesting time.

In one aspect, the present disclosure provides an apparatus, system, and method to confirm design predictions of a production rate of a desired radioisotope and determine whether the activity of the desired radioisotope is high enough to begin harvesting operations. The apparatus has no moving parts and is not susceptible to operating characteristic changes due to radiation exposure.

In one aspect, the apparatus, system, and method according to the present disclosure enables the production of radioisotopes, such as Co-60, for example, above a certain minimum required activity level without the need to cut open the target assembly rodlets. The application of the apparatus, system, and method according to the present disclosure can reduce certain commercial risks associated with the production of radioisotopes.

Figure 1:
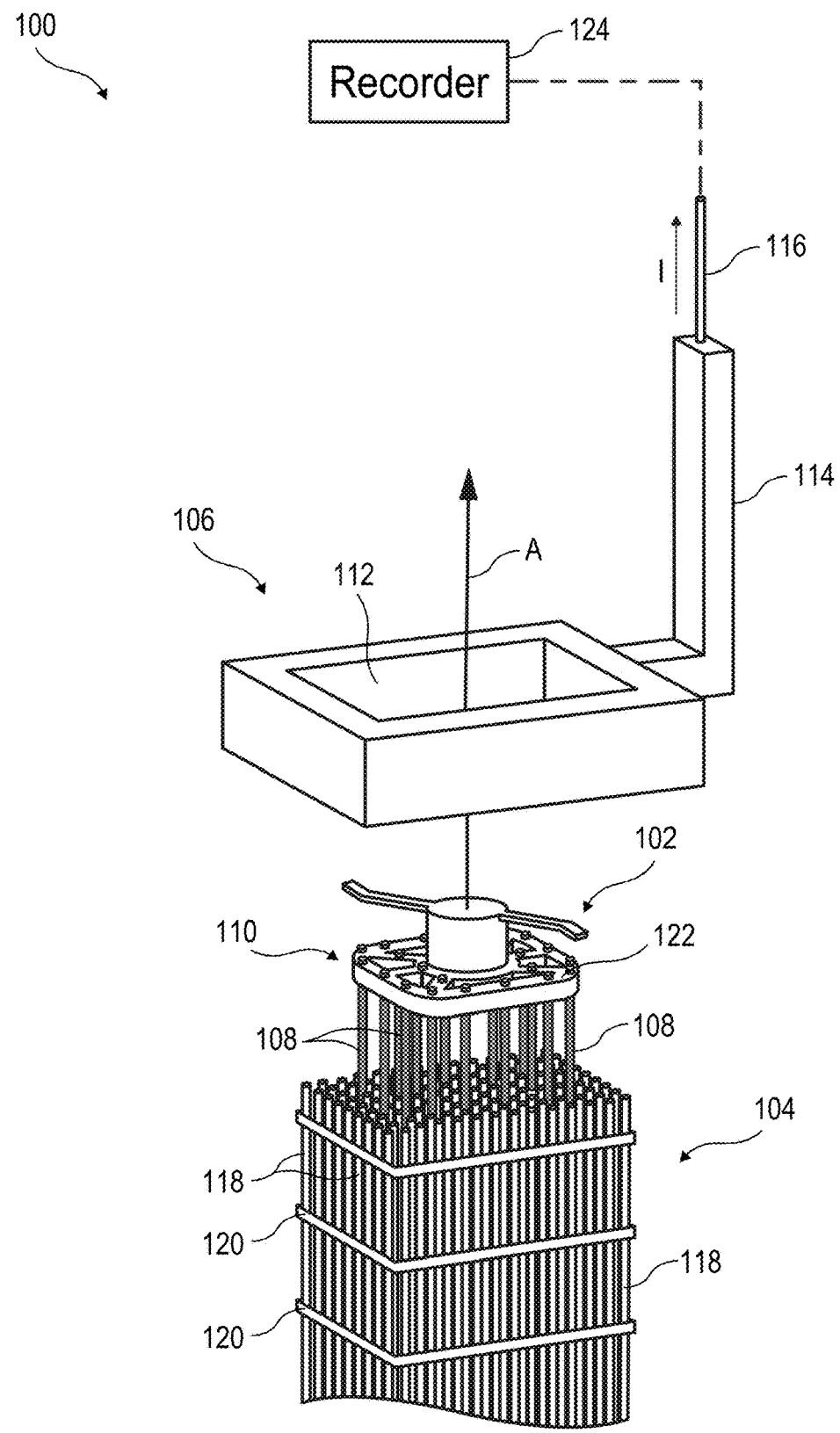
FIG. 1 illustrates a radioisotope activity surveillance system for use with fuel rod assembly insert targets, in accordance with at least one aspect of the present disclosure.

Turning now to the figures, FIG. 1 illustrates a radioisotope activity surveillance system 100 for use with fuel rod assembly insert targets, in accordance with at least one aspect of the present disclosure. The radioisotope activity surveillance system 100 comprises a target assembly 102 slidably disposed within a fuel rod assembly 104 in a nuclear reactor and a sensing assembly 106 configured to receive the target assembly 102 as indicted by arrow A. The target assembly 102 comprises target material rods 108 fixedly coupled to an orifice plate 122 of a top nozzle 110 that are slidably inserted into the fuel rod assembly 104. The target material rods 108 are made of a metal structure, such as steel. The target material rods 108 receive a specific neutron flux exposure level for a minimum amount of reactor operating time. The radioisotope activity surveillance system 100 is used to measure radioisotope activity of the target material rods 108. The orifice plate 122 is sized and configured to receive the target material rods 108 and the top nozzle 110 allows the target material rods 108 to be withdrawn from, or inserted into, the fuel rod assembly 104. The top nozzle 110 is withdrawn or inserted through the sensing assembly 106.

The production of desired amounts of medical or industrial radioisotopes inside a commercial power generating reactor, such as Co-60, requires that the target material rods 108 are inserted into the fuel rod assembly 104 inside the reactor to receive a specific level of neutron flux exposure for a minimum amount of reactor operating time. In order to determine whether the irradiation target material rods 108 are ready to be harvested requires that the activity level of the desired radioisotope inside the target assembly 102 is measured. The radioisotope activity surveillance system 100 is employed to measure the activity of a desired radioisotope during a reactor refueling outage so a decision on whether to extract and process the irradiation target material rods 108 can be made. In use, the radioisotope activity surveillance system 100 allows the progress of the production of the desired radioisotope material to be determined during refueling outages that occur prior to the expected harvesting time.

The fuel rod assembly 104 comprises a plurality of fuel rods 118. Grid spacers 120 hold the fuel rod 118 bundles in position, maintain appropriate rod-to-rod clearance, and enhance critical heat flux. The target material rods 108 are slidably disposed between the fuel rods 118.

The sensing assembly 106 defines an opening 112 large enough to receive the target assembly 102. In the example illustrated in FIG. 1, the sensing assembly 106 defines a rectangular opening 112 to accommodate a rectangular orifice plate 122 that lifts the target material rods 108. In various aspects, however, the shape of the opening 112 may be hexagonal for use with hexagonal fuel assembly designs or may define any suitable shape to accommodate the shape of the fuel assembly design, square, circular, elliptical, or any suitable configuration. The sensing assembly 106 is connected to a handle 114. The sensing assembly 106 is electrically coupled to a platinum self-powered detector (SPD) signal cable 116 that is disposed within the handle 114. To measure the radioisotope activity of the target material rods 108, the target assembly 102 is passed through the opening 112 of the sensing assembly 106 at a constant rate while the fuel rod assembly 104 remains stationary below the opening 112. Gamma radiation detected by the sensing assembly 106 generates a current (I) through the SPD signal cable 116 and is recorded by a voltage and current data logger or recorder 124.

Figure 2:
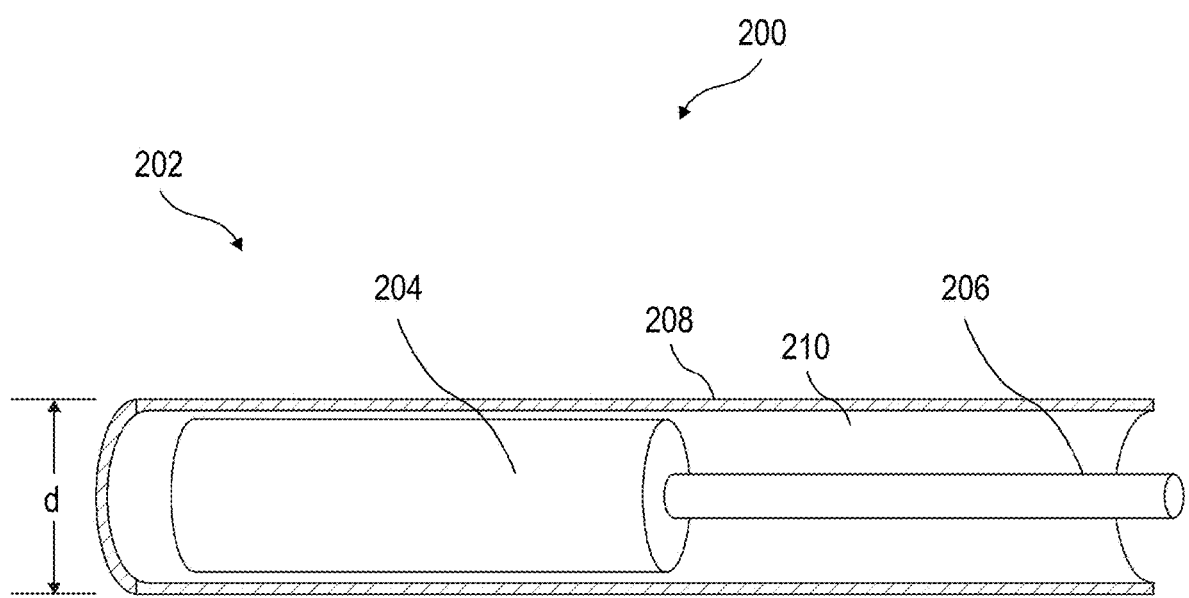
FIG. 2 illustrates a self-powered detector (SPD) assembly, in accordance with at least one aspect of the present disclosure.

FIG. 2 illustrates a self-powered detector (SPD) assembly 200, in accordance with at least one aspect of the present disclosure. With reference also to FIG. 1, the sensing assembly 106 comprises the self-powered detector assembly 200. The SPD assembly 200 comprises a sensing portion 202 that employs an emitter wire 204 made of platinum, or other prompt responding gamma sensitive material, for example. The emitter wire 204 is electrically connected to a signal wire 206 made of steel, for example. The emitter wire 204 and the steel signal wire 206 are encased in an outer sheath 208 that may be made of steel, for example. An electrical insulator material 210, such as Magnesium Oxide (MgO), fills the space defined the outer sheath 208. The electrical insulator material 210 is used as an insulated core that wraps the emitter wire 204 and acts as a guide insulator to guide the signal wire 206. In one aspect, the outside diameter 'd' of the outer sheath 208 may be about 0.08 in. In various aspects, the outside diameter 'd' of the outer sheath 208 may be selected in a range between 0.05 in. to 0.15 in., for example. The emitter wire 204 may have a length 'L1' of about 10 ft., for example, the signal wire 206 may have a length 'L2' of about 60 ft., for example.

In various aspects, the SPD assembly 200 emitter wire 204 comprises an emitter core of at least one material selected from nickel, iron, titanium and alloys based on these metals, and an emitter outer layer around the core which has a thickness in the range of the order of 0.03 mm to of the order of 0.062 mm and which is of at least one material selected from platinum, tantalum, osmium, molybdenum and cerium. With this construction, by increasing the emitter diameter beyond the optimum for a solid platinum emitter, the ratio of neutron to gamma-ray sensitivity, and hence the prompt response fraction, is increased while an acceptably small burnup rate is maintained. Larger diameter emitters of this construction have response characteristics that closely match those required for a fuel power detector in, for example, heavy-water-moderated, natural uranium power reactors. The emitter core is preferably of inconel (Trademark) and the emitter jacket is preferably of platinum.

Figure 3:
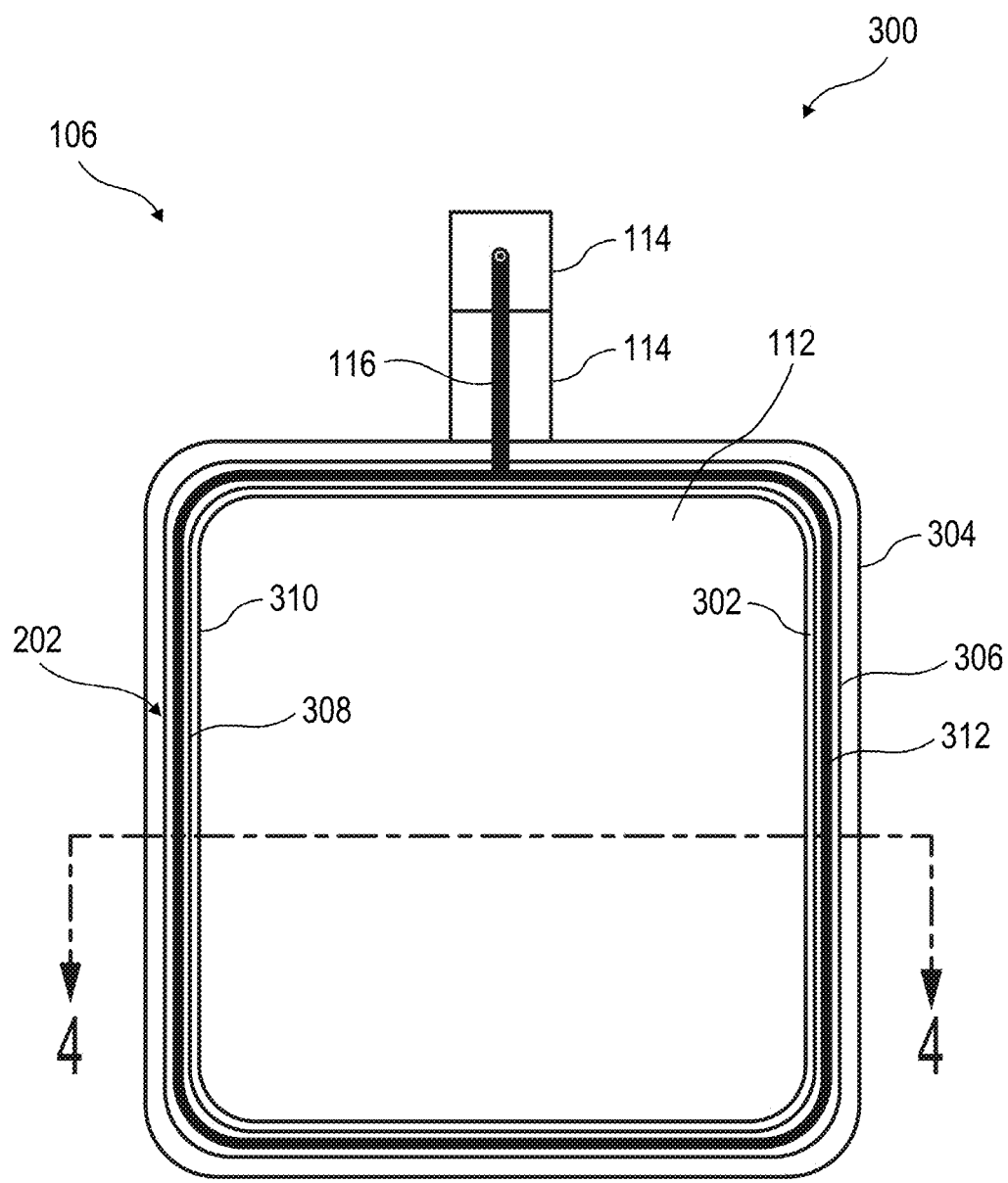
FIG. 3 is a top view of a sensing assembly, in accordance with at least one aspect of the present disclosure.
Figure 4:
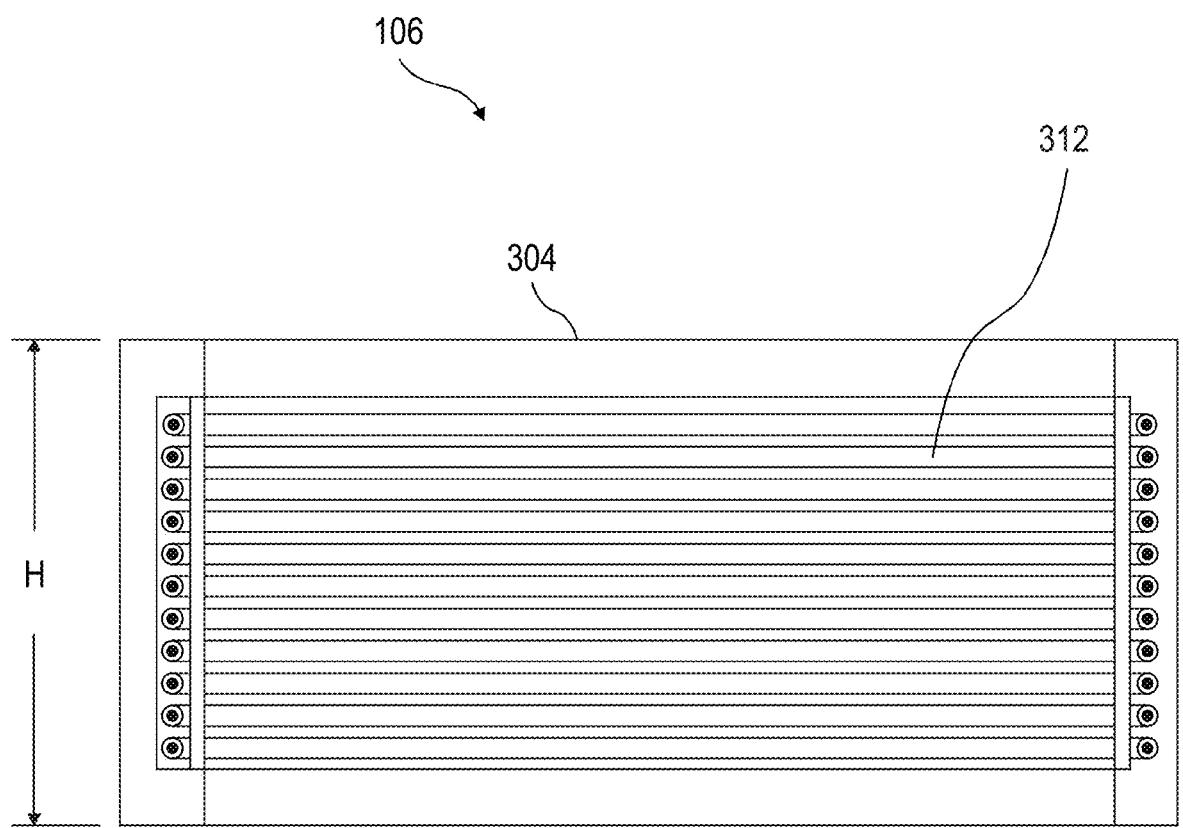
FIG. 4 is a section view of a sensing assembly taken along section line 4-4, in accordance with at least one aspect of the present disclosure.

FIG. 3 is a top view 300 of the sensing assembly 106, in accordance with at least one aspect of the present disclosure. FIG. 4 is a section view of the sensing assembly taken along section line 4-4, in accordance with at least one aspect of the present disclosure. With reference now to FIGS. 1-4, the sensing assembly 106 comprises an inner case 302 and an outer shielding 304 and a space 306 defined therebetween to accommodate a spiral wound sensing portion 202 of the self-powered detector assembly 200 shown in FIG. 2. The inner case 302 is a shell that serves as the inside face of the sensing assembly 106. The inner case 302 has an inside face 308 and an outside face 310. The outside face 310 faces the opening 112. The sensing portion 202 of the SPD assembly 200 is a coil 312 spiral wound around the outside face 308 of the inner case 302. The length 'L1' of the sensing portion 202 of the SPD emitter wire 204 and the tightness of the coil 312 are determined using the measured SPD gamma sensitivity and the expected gamma activity of the desired radioisotope per unit length of the target(s) to be measured. The length 'L1' and the tightness of the coil 312 winding may be selected to maximize the SPD current per unit length output and minimize the height of the SPD cable coil to minimize the time required to produce a measurement with minimum measurement error.

The outer shielding 304 of the sensing assembly 106 may be constructed of a material, such as tungsten (W), that will shield the sensing portion 202 of the SPD emitter wire 204 from gamma radiation originating from outside the sensing assembly 106. The inner case 302 of the sensing assembly 106 is constructed of a material, such as steel, for example, to minimize the attenuation of the gamma radiation being used to determine the activity of the target material on the target material rods 108. The sensing assembly 106 is sealed to prevent water intrusion during use.

The sensing assembly 106 is connected to the handle 114 that serves as a means for positioning the sensing assembly 106 at the top of the target assembly 102 containing the target material rods 108 to be extracted from/inserted into the fuel rod assembly 104. The length of the handle 114 is sufficient to facilitate accessibility from the bridge in a refueling pool or casking pool. The handle 114 also serves as a conduit for the SPD signal wire 116 portion of the SPD assembly 200. The total length of the SPD signal wire 116 is sufficient to allow the SPD signal to be measured at the desired location in a target harvest area. The height 'H' of the sensing assembly 106 may be selected to be about 10 in. although the present disclosure should not be limited in this context.

Figure 5:
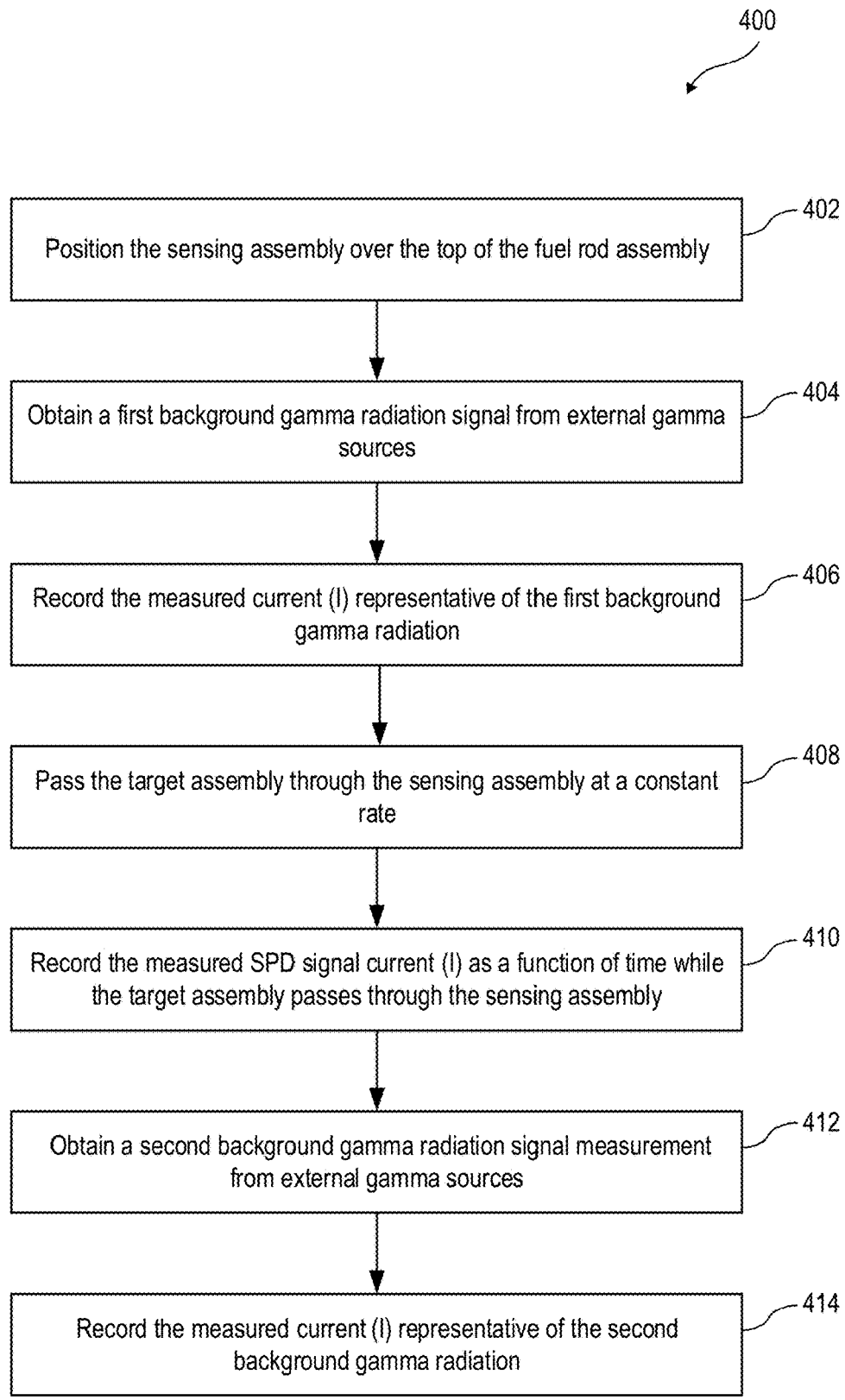
FIG. 5 illustrates a method for measuring the SPD signal to calculate radioisotope activity of the target assembly 102, in accordance with at least one aspect of the present disclosure.

In aspect, the activity measurement system 100 shown in FIG. 1 and the components thereof shown in detail in FIGS. 2-4 may be employed to measure the SPD signal to calculate the activity of the target assembly 102. FIG. 5 illustrates a method 400 for measuring the SPD signal to calculate radioisotope activity of the target assembly 102, in accordance with at least one aspect of the present disclosure. With reference now also to FIGS. 1-4, according to the method 400, position 402 the sensing assembly 106 over the top of the appropriate fuel rod assembly 104 such that the equipment needed to remove or install the target assembly 102 can be used. This can be done by manipulating the sensing assembly 106 over the fuel rod assembly 104. The position of the device handle 114 is fixed to prevent shifting during insertion or withdrawal of the target assembly 102 through the opening 112 defined by the sensing assembly 106.

After positioning 402 the sensing assembly 106 into the desired position, a first background gamma radiation signal measurement from external gamma sources is obtained 404 by measuring a current (I) through the SPD signal cable 116, with a desired measurement accuracy, before passing (extracting/inserting) the target assembly 102 through the sensing assembly 106. The measured current (I) representative of the background gamma radiation is then recorded 406 by the recorder 124.

After recording 406 the background gamma radiation signal current (I), the target assembly 102 is passed 408 (withdrawn or inserted) through the sensing assembly 106 at a constant rate. The rate should be controlled to allow the measurement accuracy of the measured SPD signal current (I) to be controlled. The measured SPD signal current (I) as a function of time is recorded 410 by the recorder 124 while the target assembly 102 passes 408 through the sensing assembly 106. After the target assembly 102 is fully passed 408 through the sensing assembly, a second background gamma radiation signal measurement from external gamma sources is obtained 412 and the measured SPD signal current (I) is recorded 414 by the recorder 124. The method 400 is repeated as needed to measure gamma radiation signals for all the desired target assemblies 102.

The total radioisotope activity of the desired radioisotope of the target assembly 102 is determined by integrating a fitted function of the measured self-powered detector signal current (I) versus time over the active length of the target assembly 102. The integrated region is determined using the withdrawal/insertion 408 rate and measured self-powered detector signal current (I) data when the active portion of the target assembly 102 is inside the opening 112 defined by the sensing assembly 106. An example of the analysis method used in one approach is described by the process 500 described in FIG. 6.

Figure 6:
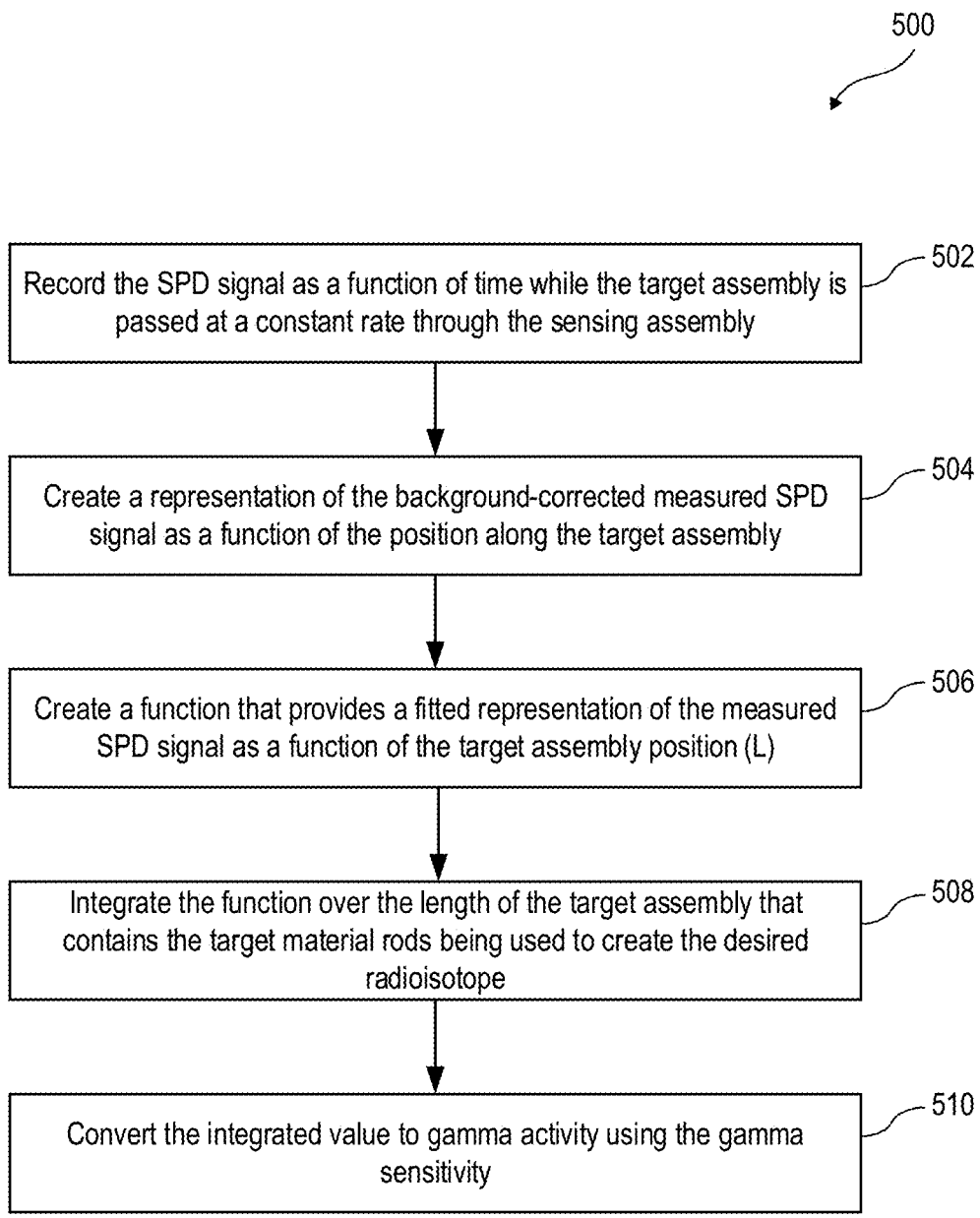
FIG. 6 illustrates a method for analyzing total activity of a desired radioisotope, in accordance with at least one aspect of the present disclosure.

FIG. 6 illustrates a method 500 for analyzing total activity of a desired radioisotope, in accordance with at least one aspect of the present disclosure. With reference now also to FIGS. 1-4, according to the method 500, the SPD signal as a function of time is recorded 502 while the target assembly 102 is passed at a constant rate through the sensing assembly 106. The target assembly 102 contains the target material rods 108 being used to create the desired radioisotope. A representation of the background-corrected measured SPD signal is created 504 as a function of the position along the target assembly 102. A function is created 506 that provides a fitted representation of the measured SPD signal as a function of the target assembly 102 position (L) (e.g., $-y(L)=a_0+a_1(L)+a_2(L)^2+a_3(L)^3+ \ldots +a_n(L)^n$). After the function is created 506, the function is integrated 508 over the length of the target assembly 102 that contains the target material rods 108 being used to create the desired radioisotope (i.e., -0-L). The integrated value is converted 510 to gamma activity using the gamma sensitivity, either measured or provided by the manufacturer, and the spatial adjustment can be easily determined by those skilled in the art. The results of this method 500 can be used to determine 512 whether to proceed with harvesting or production of the desired radioisotope.

EXAMPLES

Various aspects of the subject matter described herein are set out in the following examples.

Example 1. A radioisotope activity surveillance system, comprising: a fuel rod assembly comprising a plurality of nuclear fuel rods; a target assembly comprising: a top nozzle comprising an orifice plate; and at least one target material rod fixedly coupled to the orifice plate, wherein the at least one target material rod is slidably disposed within the fuel rod assembly; and a sensing assembly defining an opening sized and configured to receive the target assembly therethrough, the sensing assembly comprising a self-powered detector assembly to detect radioisotope activity of the target rod material.

Example 2. The radioisotope activity surveillance system of Example 1, wherein the self-powered detector assembly comprises: a sensing portion comprising an emitter wire; and a signal wire electrically coupled to the emitter wire; wherein the emitter wire is made of a prompt responding gamma sensitive material and generates an electrical current when exposed to gamma radiation; and wherein the emitter wire and the signal wire are encased in an outer sheath.

Example 3. The radioisotope activity surveillance system of any one or more of Examples 1 through 2, wherein the emitter wire comprises platinum.

Example 4. The radioisotope activity surveillance system of any one or more of Examples 1 through 3, wherein the signal wire is made of steel.

Example 5. The radioisotope activity surveillance system of any one or more of Examples 1 through 4, wherein the outer sheath is made of steel.

Example 6. The radioisotope activity surveillance system of any one or more of Examples 1 through 5, wherein the outer sheath is filled with an electrical insulator material.

Example 7. The radioisotope activity surveillance system of any one or more of Examples 1 through 6, wherein the electrical insulator material is Magnesium Oxide (MgO).

Example 8. The radioisotope activity surveillance system of any one or more of Examples 1 through 7, wherein the sensing assembly comprises: an inner case; an outer shielding; and a space defined therebetween to accommodate a spiral wound sensing portion of the self-powered detector assembly.

Example 9. The radioisotope activity surveillance system of any one or more of Examples 1 through 8, wherein the outer shielding is constructed of a material to shield the sensing portion emitter wire from gamma radiation originating from outside the sensing assembly.

Example 10. The radioisotope activity surveillance system of any one or more of Examples 1 through 9, wherein the outer shielding is constructed of tungsten (W).

Example 11. The radioisotope activity surveillance system of any one or more of Examples 1 through 10, wherein the sensing assembly is connected to a handle.

Example 12. The radioisotope activity surveillance system of any one or more of Examples 1 through 11, wherein the handle is configured to position the sensing assembly at atop of the target assembly containing the target material rods to be extracted from/inserted into the fuel rod assembly.

Example 13. A method for measuring a self-powered detector signal to calculate radioisotope activity of a target assembly, a target assembly comprising a top nozzle comprising an orifice plate and at least one target material rod fixedly coupled to the orifice plate, wherein the at least one target material rod is slidably disposed within the fuel rod assembly, the method comprising: positioning a sensing assembly over a fuel rod assembly, the sensing assembly defining an opening sized and configured to receive the target assembly therethrough, the sensing assembly comprising a self-powered detector assembly to detect radioisotope activity of the target rod material; obtaining, by the sensing assembly, a first background gamma radiation signal measurement from external gamma sources; recording the first background gamma radiation signal measurement by a recorder; passing the target assembly through the sensing assembly at a constant rate; recording, by the recorder, a measured self-powered detector signal current (I) as a function of time while the target assembly passes through the sensing assembly; obtaining a second background gamma radiation signal measurement from external gamma sources after the target assembly is fully passed through the sensing assembly; and recording the second background gamma radiation signal measurement by the recorder.

Example 14. The method of Example 13, comprising determining total radioisotope activity of the target assembly by integrating a fitted function of the measured self-powered detector signal current (I) versus time over an active length of the target assembly.

Example 15. The method of any one or more of Examples 13 through to 14, comprising determining an integrated region based on a withdrawal/insertion rate and the measured self-powered detector signal current (I) recorded when an active portion of the target assembly is inside the opening defined by the sensing assembly.

Example 16. The method of any one or more of Examples 13 through 15, wherein the first and second background gamma radiation signal measurements from external gamma sources are obtained by measuring a current (I) through the self-powered detector signal cable.

Example 17. A method for analyzing total activity of a desired radioisotope, the method comprising: recording a self-powered detector signal as function of time while a target assembly is passed at a constant rate through a sensing assembly, wherein the target assembly contains the target material rods being used to create the desired radioisotope; creating a representation of the background-corrected measured self-powered detector signal as a function of position along the target assembly; creating a function that provides a fitted representation of the measured self-powered detector signal as a function of the target assembly position (L); integrating the function over a length of the target assembly that contains the target material rods being used to create the desired radioisotope; and converting the integrated value to gamma activity based on gamma sensitivity.

Example 18. The method of Example 17, comprising determining whether to harvest the desired radioisotope based on the gamma activity.

Example 19. The method of any one or more of Examples 17 through 18, wherein the function has the form of: $-y(L)=a_0+a_1(L)+a_2(L)^2+a_3(L)^3+\ldots+an(L)^n$.

While specific embodiments of the invention have been described in detail, it will be appreciated by those skilled in the art that various modifications and alternatives to those details could be developed in light of the overall teachings of the disclosure and that selected elements of one or more of the example embodiments may be combined with one or more elements from other embodiments without varying from the scope of the disclosed concepts. Accordingly, the particular embodiments disclosed are meant to be illustrative only and not limiting as to the scope of the invention which is to be given the full breadth of the appended claims and any and all equivalents thereof.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system that "comprises," "has," "includes" or "contains" one or more elements possesses those one or more elements, but is not limited to possessing only those one or more elements. Likewise, an element of a system, device, or apparatus that "comprises," "has," "includes" or "contains" one or more features possesses those one or more features, but is not limited to possessing only those one or more features.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope of the disclosure.

What is claimed is:

1. A radioisotope activity surveillance system, comprising:
   a fuel rod assembly comprising a plurality of nuclear fuel rods;
   a target assembly comprising:
      a top nozzle comprising an orifice plate; and
      at least one target material rod fixedly coupled to the orifice plate, wherein the target assembly is movable to slidably dispose the at least one target material rod within the fuel rod assembly, and wherein the fuel rod assembly is configured to irradiate the at least one target material rod to produce radioisotopes when the at least one target material rod is slidably disposed within the fuel rod assembly; and
   a sensing assembly defining an opening sized and configured to receive the target assembly therethrough, the sensing assembly comprising:
      a housing, wherein an outside surface of the housing defines the opening; and
      a self-powered detector assembly to detect radioisotope activity of the at least one target material rod, wherein the self-powered detector assembly comprises a spiral wound sensing portion disposed in the housing.

2. The radioisotope activity surveillance system of claim 1, wherein the spiral wound sensing portion comprises an emitter wire made of a prompt responding gamma sensitive material and generates an electrical current when exposed to gamma radiation, wherein the self-powered detector assembly further comprises a signal wire electrically coupled to the emitter wire, and wherein the emitter wire and the signal wire are encased in an outer sheath.

3. The radioisotope activity surveillance system of claim 2, wherein the emitter wire comprises platinum.

4. The radioisotope activity surveillance system of claim 2, wherein the signal wire is made of steel.

5. The radioisotope activity surveillance system of claim 2, wherein the outer sheath is made of steel.

6. The radioisotope activity surveillance system of claim 2, wherein the outer sheath is filled with an electrical insulator material.

7. The radioisotope activity surveillance system of claim 6, wherein the electrical insulator material is Magnesium Oxide (MgO).

8. The radioisotope activity surveillance system of claim 1, wherein the housing comprises:
   an inner case, wherein the inner case faces the opening and comprises the outside surface of the housing that defines the opening; and
   an outer shielding connected to the inner case to form the housing, wherein a space between the inner case and the outer shielding accommodates the spiral wound sensing portion.

9. The radioisotope activity surveillance system of claim 8, wherein the outer shielding is constructed of a material to shield the sensing portion from gamma radiation originating from outside the sensing assembly.

10. The radioisotope activity surveillance system of claim 9, wherein the outer shielding is constructed of tungsten (W).

11. The radioisotope activity surveillance system of claim 1, wherein the sensing assembly is connected to a handle.

12. The radioisotope activity surveillance system of claim 1, wherein the radioisotopes comprise cobalt-60 (Co-60).

* * * * *